Patented Apr. 18, 1950

2,504,120

UNITED STATES PATENT OFFICE 2,504,120

PLASTICIZED POLYVINYL COMPOSITIONS

Harry R. Gamrath, St. Louis, Mo., assignor to Monsanto Chemical Company, St. Louis, Mo., a corporation of Delaware No Drawing. Application June 5, 1947,
Serial No. 752,830

12 Claims. (Cl. 260—30.6)

This invention relates to novel compositions comprising monoalkyl diaryl phosphate esters and vinyl resins containing polymerized vinyl chloride. More particularly, this invention relates to novel compositions containing certain monoalkyl phenyl cresyl phosphate esters and a polyvinyl chloride resin. Herein the use of the phrase "polyvinyl chloride resin" is meant to include broadly polymerized vinyl chloride, vinyl chloride copolymers and compositions containing both polymerized vinyl chloride and vinyl chloride copolymers.

Heretofore, resins such as polyvinyl chloride or copolymer resins such as polyvinyl chloride-acetate, which are normally rigid and brittle in their unplasticized state, have been commonly plasticized with compounds such as dioctyl phthalate, dibutyl sebacate and tricresyl phosphate, and films and sheets formed therefrom possess, in addition to other desirable properties, a durability and flexibility affording them extensive utility as materials for the fabrication of shoes, handbags, seat and cushion coverings, shower curtains and coated fabrics. For many of these uses, it has become necessary and highly desirable that a single plasticizer when incorporated with a polyvinyl chloride resin will produce a plastic composition which will possess the three essential characteristics of low-temperature flexibility, low volatility losses of the plasticizer and non-inflammability, whereas the plasticized compositions known and used up to the present time have been deficient in at least one of these three essential characteristics. In practical use, these articles of manufacture are oftentimes subjected to the freezing temperatures of winter weather and it is necessary that these sheets and films retain their flexility characteristics at these temperatures. While compositions plasticized with dioctyl phthalate and dibutyl sebacate retain their flexibility at low temperatures, these plasticizers have the undesirable quality of being inflammable. In addition, dibutyl sebacate is unsatisfactory as a plasticizer for polyvinyl chloride resin compositions because of its high volatility. On the other hand, when tricresyl phosphate, which is a very good plasticizer from the standpoint of low volatility and non-inflammability, is used to plasticize polyvinyl chloride resins the compositions rapidly lose their flexibility at cooler temperatures and become stiff and hard at freezing temperatures. Although the low-temperature flexibility characteristics of compounds plasticized with tricresyl phosphate are improved to some extent by the use of a secondary plasticizer such as dibutyl phthalate, the compositions are unsatisfactory for many uses because of the high volatility and the inflammability of the dibutyl phthalate. The use of triphenyl phosphate as a plasticizer for polyvinyl chloride resins is not desirable for the reason that triphenyl phosphate is incompatible with polyvinyl chloride resins and a secondary plasticizer must be employed to facilitate compatibility. While trioctyl phosphate is also useful as a plasticizer for polyvinyl chloride resins, the high volatility of trioctyl phosphate is objectionable.

In view of this state of the art it has become highly desirable that a plasticizer be discovered for polyvinyl chloride resin compositions which would not only insure good low-temperature flexibility characteristics but would also insure retention of the plasticizer at higher temperatures, and in addition, inasmuch as polyvinyl chloride resin compositions are being developed for coatings for textiles to be fabricated into clothing, drapes and furniture coverings, as a safety precaution and a fire prevention measure, it is most desirable that the plasticized compositions be non-inflammable. It is most desirable to have a plasticizer which when in combination with polyvinyl chloride resins will produce compositions having the combination of properties of low-temperature flexibility, low volatility losses and non-inflammability.

It is an object of this invention to provide improved polyvinyl chloride resin compositions. Another object is to provide new monoalkyl phenyl cresyl phosphate esters. A further object is to provide novel plastic compositions comprising polyvinyl chloride resins and certain monoalkyl phenyl cresyl phosphate esters. A further object is to provide plasticized polymerized vinyl chloride resin compositions wherein a single plasticizer when in combination with polyvinyl chloride resin produces compositions having at least the three highly desirable characteristics of low-temperature flexibility, low volatility losses and non-inflammability. Further objects will be apparent to those skilled in the art from the following description and claims.

According to the present invention, generally stated, when polyvinyl chloride resins, particularly polyvinyl chloride and polyvinyl chloride copolymers, are plasticized with monoalkyl diaryl phosphate esters of the type

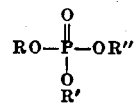

wherein R is an alkyl group of 6 to 12 carbon atoms or an alkoxyethyl group wherein the alkyl substituent has 4 to 12 carbon atoms, and wherein R' represents the phenyl radical and wherein R'' represents a cresyl radical such as ortho-cresyl, meta-cresyl or para-cresyl, new compositions are formed which possess a group of desirable properties not heretofore obtainable with the formerly used plasticizers. Herein, when either the phrase "monoalkyl diaryl phosphate esters" or "monoalkyl phenyl cresyl phosphates" is used, it is the intention that the phrase include only the above described compounds.

According to one embodiment of this invention, plastic compositions may be prepared comprising certain monoalkyl phenyl cresyl phosphate esters and any vinylhalide polymer or vinylhalide copolymer which is normally valued for its elastomeric properties when plasticized. Polymerized or copolymerized vinyl chloride resin compositions, which are known to those skilled in the art as being elastomeric when plasticized and are valued for their many desirable and useful characteristics, are illustrated by polyvinyl chloride, polyvinyl chloride-acetate, and copolymers of polyvinyl chloride with methyl methacrylate, diethyl maleate or vinylidine chloride. According to another embodiment of this invention, when polyvinyl chloride resins, particularly polyvinyl chloride and polyvinyl chloride copolymers, are plasticized with the herein described monoalkyl phenyl cresyl phosphates, compositions result which exhibit the desirable combination of excellent low-temperature flexibility characteristics, low volatility losses of plasticizer and non-inflammability; and, in addition, the compositions of this invention possess improved resistance to the absorption of oil. Prior to the present invention, polyvinyl resins plasticized with other known plasticizers which impart good low-temperature flexibility frequently resulted in compositions possessing poor oil absorption resistance. However, compositions plasticized with the herein described monoalkyl diaryl phosphates possess excellent low-temperature flexibility characteristics and have improved resistances to oil absorption.

Monoethyl diphenyl phosphate and monomethyl diphenyl phosphate have been disclosed in the art as plasticizers for cellulose esters. However, when it was attempted to use these esters with polyvinyl chloride or copolymers of polyvinyl chloride, the esters decomposed at the working temperatures of the roll mills and, therefore, there was no indication of the utility of this type of phosphate ester as a plasticizer for polyvinyl chloride resins or copolymer resins of polyvinyl chloride.

While, according to this invention, plastic compositions may be prepared from various polyvinyl chloride resins and the monoalkyl diaryl phosphates as hereinbefore described, the invention is particularly applicable to compositions containing polyvinyl chloride and copolymers of polyvinyl chloride such as polyvinyl chloride-acetate and polyvinyl chloride-vinylidine chloride. While the properties of individual compounds as plasticizers in specific compositions will be shown in examples appearing hereinafter, the plasticizers of this invention are illustrated by the following compounds, although it is not intended that this invention be limited to the following compounds:

Hexyl phenyl cresyl phosphate
2-methylpentyl phenyl cresyl phosphate
n-Hexyl phenyl cresyl phosphate
Octyl phenyl cresyl phosphate
2-ethylhexyl phenyl cresyl phosphate
n-Octyl phenyl cresyl phosphate
Nonyl phenyl cresyl phosphate
n-Decyl phenyl cresyl phosphate
Lauryl phenyl cresyl phosphate
Butoxyethyl phenyl cresyl phosphate
2-methylpentoxyethyl phenyl cresyl phosphate
Hexoxyethyl phenyl cresyl phosphate
Octoxyethyl phenyl cresyl phosphate
2-ethylhexyloxyethyl phenyl cresyl phosphate
Nonyloxyethyl phenyl cresyl phosphate
Decyloxyethyl phenyl cresyl phosphate
Lauroxyethyl phenyl cresyl phosphate In the above examples, the nonyl and lauryl radical may be derived, in addition to the conventional sources, from the polymerization products of propylene, or the lauryl radical may be derived from the polymerization products of butylenes.

A mixture of alkyl phenyl cresyl phosphates in which the alkyl residues are obtained from a mixture of monohydric alcohols derived from coconut oil of which substantially 60% of the alkyl radicals contain at least 8 and not more than 12 carbon atoms.

In all the above examples, the cresyl radical may be ortho-cresyl, para-cresyl or meta-cresyl, for example, octyl phenyl o-cresyl phosphate, octyl phenyl p-cresyl phosphate or octyl phenyl m-cresyl phosphate. Also, useful plasticizing compositions which are also contemplated by this invention may be a mixture of compounds having different isomeric cresyl radicals, such as a mixture of octyl phenyl m-cresyl phosphate and octyl phenyl p-cresyl phosphate.

The monoalkyl diaryl phosphate esters of this invention may be prepared in the manner illustrated by the following examples:

*2-ethylhexyl phenyl p-cresyl phosphate*

For the production of 100 pounds of 2-ethylhexyl phenyl p-cresyl phosphate, 44.5 pounds of phosphorus oxychloride is cooled to 15° C. in a closed enameled reactor. Thirty-eight pounds of 2-ethyl hexanol which has been cooled to approximately 15° C. is added to the POCl₃ with continuous stirring and at such a rate so as to maintain a reaction-mass temperature of 10–15° C. After the addition of the 2-ethyl hexanol is complete, the agitation is continued and the reaction temperature is allowed to rise to 25° C. The reaction-mass temperature is maintained at 25° C. and the agitation continued for at least one hour during which time a vacuum is gradually applied to the reaction vessel, to remove the hydrogen chloride which is evolved, until an absolute pressure of 50 mm. of Hg is reached. The reaction vessel now contains octyl phosphoryl dichloride and is ready for use in the next step which is a Schotten-Baumann reaction with the sodium arylates.

The sodium arylates are prepared by charging an iron kettle with 81.4 pounds of water, 28.6 pounds of phenol, 32.9 pounds of p-cresol and 49 pounds of 50% sodium hydroxide in a manner and at such a rate as to maintain a solution temperature below 25° C.

The crude 2-ethylhexyl phenyl p-cresyl phosphate is produced by charging the 2-ethylhexyl phosphoryl dichloride to the above prepared aqueous solution of sodium p-cresylate and sodium phenate at such a rate as to maintain a reaction temperature below 3° C. After the addition of the octyl phosphoryl dichloride is complete, the stirring is continued and the temperature is allowed to rise to 20° C. The agitation is then stopped and the mixture is allowed to stand until an ester layer and an aqueous salt layer form and the crude ester is thereupon drawn off.

Purification is effected by washing the ester with dilute aqueous sodium hydroxide until the phenolic bodies and partial esters are removed. If desired, the ester may be further purified and refined by a choice of a variety of techniques well known to those familiar with the art of refining phosphate esters. The yield of 2-ethylhexyl phenyl p-cresyl phosphate from the above process, based on the $POCl_3$ charged, was 92%.

The refined 2-ethylhexyl phenyl p-cresyl phosphate prepared in the above manner had the following properties:

| | |
|---|---|
| Sp. gr. 25/25° C | 1.0785 |
| Ref. index 25° C | 1.5082 |
| Color | Nearly water white |

Moreover, infra red spectra analysis of the final product favors the conclusion that the final product was 2-ethyl hexyl phenyl p-cresyl phosphate and not a simple mixture of 2-ethylhexyl diphenyl phosphate and 2-ethylhexyl di-p-cresyl phosphate.

100-pound quantities of 2-ethylhexyl phenyl o-cresyl phosphate or 2-ethylhexyl phenyl m-cresyl phosphate may be prepared by using the exact procedure of the above example by substituting 32.9 pounds of o-cresol or 32.9 pounds of m-cresol for the 32.9 pounds of p-cresol which was used in the above example.

Moreover, in practice, it will be expedient to prepare monoalkyl phenyl cresyl phosphates by using a mixture of isomeric cresols such as are commonly encountered in "commercial cresol." By "commercial cresol" is meant the article of commerce designated "commercial cresol" and including such compositions as are described by Field, Dempster and Tilson, Ind. Eng. Chem. 32, 489, 495 (1940).

The final product, when "commercial cresol" is used as the source of the cresyl substituent, will be a mixture of monoalkyl phenyl o-cresyl phosphate, monoalkyl phenyl m-cresyl phosphate, monoalkyl phenyl p-cresyl phosphate and, in addition, monoalkyl phenyl xylyl phosphates, as "commercial cresol" normally contains a percentage of isomeric xylols.

*2-ethylhexyl phenyl cresyl phosphate, using "commercial cresol" as the source of the cresyl substituent*

A 100-pound quantity of 2-ethylhexyl phenyl cresyl phosphate was prepared in the exact manner described in the foregoing example for the preparation of 100 pounds of 2-ethylhexyl phenyl p-cresyl phosphate, with the exception that 32.9 pounds of a "commercial cresol" having the approximate analysis:

| | Per cent |
|---|---|
| Ortho cresol | 2 |
| Meta cresol | 45 |
| Para cresol and xylenols | 53 | was substituted for the 32.9 of p-cresol in the preparation of the sodium cresylate solution. The yield of 2-ethylhexyl phenyl cresyl phosphate esters, based on $POCl_3$, was 91%.

The 2-ethylhexyl phenyl cresyl phosphates prepared by using the above "commercial cresol" as the source of the cresyl substituent had the following properties:

| | |
|---|---|
| Spr. gr. 25/25° C | 1.0749 |
| Ref. index 25° C | 1.5080 |
| Color | Nearly water white |

*Lauryl phenyl cresyl phosphate*

115.1 g. of $POCl_3$ is cooled with stirring to about 20° C. in a closed glass reaction vessel. 139.5 g. of lauryl alcohol is cooled to approximately 20° C. and added to the $POCl_3$ with continuous stirring and at a rate so as to maintain a reaction temperature of 20° C. The reaction mixture is agitated and the temperature is slowly raised to 30 to 40° C. and maintained at that temperature for one hour following the addition of all the lauryl alcohol; thereafter, the temperature is raised to approximately 50° C. and the stirring continued for another hour. The hydrogen chloride gas which is evolved from the reaction is continuously removed by means of applying a vacuum to the reaction vessel.

The reaction vessel now contains lauryl phosphoryl dichloride and is ready for use in the next step which is a Schotten-Baumann reaction with the sodium arylates.

The sodium arylates are prepared by reacting 74 g. of phenol, 85 g. of cresol with 63 g. of NaOH dissolved in 265 cc. of $H_2O$ in such a manner and added at such a rate so as to maintain a solution temperature below 25° C. The solution of sodium phenate and sodium cresylate is cooled to 5° C. and the lauryl phosphoryl dichloride is added to the solution of the sodium arylates at such a rate as to maintain a reaction temperature below 5° C. After the addition of the lauryl phosphoryl dichloride is complete, the stirring is continued and the temperature is allowed to rise to 20° C.–25° C. The reaction mixture is then allowed to stand until an ester layer and an aqueous layer form and the crude ester layer is separated from the aqueous layer. The separation of the lauryl phenyl cresyl phosphate is not very sharp and, therefore, it is usually necessary to add NaCl to the reaction mixture to aid in the salting out of the ester.

Purification is effected by washing the ester with dilute aqueous sodium hydroxide until the phenolic bodies and partial esters are removed. If desired, the ester may be further purified and refined by a choice of a variety of techniques well known to those familiar with the art of refining phosphate esters. The yield of lauryl phenyl cresyl phosphate, based on the $POCl_3$ charged, was 90%.

*2-methylpentoxyethyl phenyl cresyl phosphate*

153.4 g. of $POCl_3$ is cooled with stirring to about 10° C. in a glass lined closed reaction vessel. 146 g. of ethylene glycol mono-2-methylpentyl ether is cooled to approximately 15° C. and added to the $POCl_3$ with continuous stirring and at a rate so as to maintain a reaction temperature of 20° C. The reaction mixture is agitated and the reaction temperature of 20° C. is maintained for one hour following the addition of all the ethylene glycol mono-2-methylpentyl ether; thereafter the temperature is allowed to rise to approximately 25° C. and the stirring continued for another hour. The hydrogen chloride gas which is evolved from the reaction is continuously removed by means of applying a vacuum to the reaction vessel.

After the reaction between the ethylene glycol mono-2-methylpentyl ether and the $POCl_3$ and the removal of the hydrogen chloride have been completed, the reaction mixture containing 2-methylpentoxyethyl phosphoryl dichloride slowly added to a reactor containing 550 g. of an aqueous solution, cooled to about 0° C., containing 121.8 gms. of sodium phenate and 136.5 gms. of sodium cresylate. During the addition of the 2-methylpentoxyethyl phosphoryl dichloride, the temperature is maintained below 5° C. After the 2-methylpentoxyethyl phosphoryl dichloride has been completely added to the aqueous mixture of sodium arylates, with continuous stirring, the temperature is allowed to gradually rise to 25° C.

Upon stopping the agitation, the reaction mixture soon separates into an aqueous layer and a crude ester layer. The aqueous layer is drawn off and discarded, and the ester is purified by washing with dilute aqueous NaOH until the phenolic bodies and partial esters are removed. The ester may be further purified and refined by a choice of a variety of techniques well known to those familiar with the production of phosphate esters.

The yield of 2-methylpentoxyethyl phenyl cresyl phosphate, based on POCl₃, was about 80%.

*2-ethylhexoxyethyl phenyl cresyl phosphate*

Using the method of the above example, 174 g. of ethylene glycol mono-2-ethylhexyl ether were substituted for the 146 g. of ethylene glycol mono-2-methylpentyl ether. 2-ethylhexoxyethyl phenyl cresyl phosphate was obtained in a yield of 90% based on POCl₃, and had the following properties:

Sp. gr. 25/25° C_____ 1.0795
Ref. index 25° C_____ 1.5020

The plastic compositions comprising the polyvinyl resins and the monoalkyl diaryl phosphate plasticizers of this invention may be prepared by incorporating the plasticizer with the polyvinyl resin to the extent of 20 to 60% of the weight of the finished composition. When the plasticizer content is below the lower limit of 20%, the flexibility characteristics of the composition are seriously impaired, whereas a plasticizer content above 60% approaches the upper limit of utility. However, I have found that a plasticizer content of 25–50% and preferably 30–45% of the monoalkyl phenyl cresyl phosphate is desirable for most applications.

The plasticizer may be incorporated into the composition comprising the polyvinyl resin and the monoalkyl phenyl cresyl phosphate on a two-roll differential speed mill with a roll temperature of between 100 and 170° C., although a temperature of 120 to 140° C. was found to be quite satisfactory. The preferable rolling conditions for sheets are accomplished when the "hot" roll is maintained at 100–170° C. and the other roll is maintained at a temperature 15 to 20° C. below the temperature of the "hot" roll. Other means of mixing or kneading are well known and may be used provided a composition temperature is maintained between 100 and 170° C.

For purposes of comparison and indicating the outstanding results to be obtained by the use of the plasticizers described in this invention, the following table is presented showing the characteristics of polyvinyl chloride plasticized with the commonly used plasticizers in the amount of 40% of the total weight of the composition:

|  | Low Temp. Flex. Pt. | Volatility, Percent Loss | Inflammability | Oil Resistance |
|---|---|---|---|---|
|  | °C. |  |  |  |
| Dioctyl phthalate | −38 | 4.5 | Burns .125 sq. cm./sec. | 19.6%. |
| Dibutyl sebacate | −70 | 54.6 | Inflammable | Leaches out 10%. |
| Tricresyl phosphate | −13 | 0.7 | Non-inflammable | 7.3%. |

The following methods, which are well known to those persons skilled in the art of plasticizing resinous compositions, were used in testing all of the plastic compositions described:

The low temperature flexibility points, by the method described by Clash and Berg, Ind. Eng. Chem., 34, 1218 (1942). Volatility, samples containing 40% by weight of plasticizers were exposed for 24 hours at 105° C. in a Freas circulating oven, and the loss in weight was calculated as per cent loss of plasticizer. Inflammability, in accordance with ASTM D 568–43, method B. Herein, throughout the specification and claims, the use of the term "non-inflammable" means that the plasticized composition did not, or will not, ignite when tested in accordance with ASTM 568–43, method B. Oil resistance, in accordance with ASTM D 543–43, and the increase in weight was reported as per cent oil absorbed, and any loss in weight was reported as per cent plasticizer leached out. A Socony-Vacuum oil, meeting the specifications of the ASTM D 543–43 test, was used in all determinations.

The following examples illustrate the advantageous and unexpected results to be achieved by the use of the monoalkyl phenyl cresyl phosphates of the present invention in polyvinyl resin compositions, but it is not intended that this invention be limited by or to the examples:

*Example I*

A mixture of three parts by weight of polyvinyl chloride and two parts of 2-ethylhexyl phenyl p-cresyl phosphate was worked on a differential speed roll mill with one roll at a temperature of 140° C. until a homogeneous composition was formed. The sheet was cut from the rolls and after cooling, the following evaluation tests were run in accordance with the directions contained in the references hereinbefore set out, and the following tabulated results were observed:

| Low Temp. Flex. Pt. | Volatility, Per Cent Loss | Inflammability | Oil Resistance |
|---|---|---|---|
| °C. −26.5 | 3.2 | Non-inflam. | Per Cent 10.8 |

The results of this example show that plasticized compositions prepared with 2-ethyl hexyl phenyl p-cresyl phosphate possess the desirable combination of the most essential characteristics of plasticized compositions, namely, those of good low-temperature flexibility, low volatility losses of plasticizer and are non-inflammable. Moreover, the test indicates an improved resistance of the plasticized composition to oil absorption which is highly desirable, for the reason that plasticizers imparting good low-temperature flexibility characteristics frequently have very poor resistance to oil absorption.

Example II

Three parts by weight of polymerized vinyl chloride were intimately mixed with 2 parts by weight of the 2-ethylhexyl phenyl cresyl phosphates prepared by using, as the source of the cresyl substituents, a commercial cresol having an approximate analysis of 2% ortho-cresol, 45% meta-cresol and 53% of paracresol and xylenols. The preparation of this 2-ethyl hexyl phenyl cresyl phosphate has been hereinbefore described.

The mixture of polyvinyl chloride and the 2-ethylhexyl phenyl cresyl phosphates was worked on a two-roll, differential speed roll mill, wherein one roll was maintained at 145° C. and the other roll at 130° C., until a homogeneous composition was formed. A sheet was removed from the rolls, cooled and subjected to the evaluation tests with the following results:

| Low Temp. Flex. Pt. | Volatility, Per Cent Loss | Inflammability | Oil Resistance |
|---|---|---|---|
| °C. −32.5 | 4.2 | Non-inflam. | Per Cent 10.5 |

The desired object was obtained, that of producing a polyvinyl chloride composition having the combination of good low-temperature flexibility characteristics, low volatility loss of plasticizer upon heating and which is also non-inflammable. It will be noted that the resistance to oil absorption is much improved over the usual plasticizers which are good low-temperature flexibility plasticizers.

Example III

Three parts by weight of copolymer of vinyl chloride with vinyl acetate (combined vinyl chloride comprising approximately 94% of the copolymer resin) were intimately mixed with 2 parts by weight of lauryl phenyl cresyl phosphate and the mixture was worked on a two-roll, differential speed roll mill, with the hot roll at 140° C. until a homogeneous composition was formed. A sheet was removed from the rolls, cooled and evaluated. The sheet was non-inflammable, had a low-temperature flexibility point below −30° C. and a volatility loss of 2%.

Example IV

Three parts by weight of a copolymer of vinyl chloride with vinyl acetate (combined vinyl chloride approximately 92%) were intimately mixed with two parts by weight of 2-methylpentoxyethyl phenyl cresyl phosphate and worked on a two-roll, differential speed roll mill, wherein the hot roll was maintained at 140° C., until a homogeneous composition was formed. The preparation of this 2-methylpentoxyethyl phenyl cresyl phosphate has been hereinbefore described. A sheet of the above composition was cut from the rolls, cooled and evaluated. This plasticized sheet had a low temperature flexibility point below −30° C., showed a volatility loss of about 3½% and was non-inflammable.

As stated hereinbefore, other copolymers of vinyl chloride may be plasticized with the alkyl phenyl cresyl phosphates of this invention and illustrative examples are the copolymers of 95 to 85% by weight of vinyl chloride and 5 to 15% by weight of vinylidine chloride, diethyl maleate or methyl methacrylate.

For example, 59 grams of a vinyl copolymer resin of vinyl chloride and vinylidine chloride, wherein the combined vinyl chloride comprises 85% by weight of the copolymer resin, were intimately mixed with 40 parts by weight of 2 ethylhexoxyethyl phenyl cresyl phosphate and 1 part of lead silicate, a heat stabilizer. The mixture was placed on a two-roll differential speed roll mill with the hot roll at 140° C. and the mixture was worked until a homogeneous composition was formed. The sheets removed from the rolls had a flexibility point below −30° C., were non-inflammable and the volatility loss of plasticizer was determined to be 1.5%.

Example V

A composition consisting of 39% by weight of 2 ethylhexoxyethyl phenyl cresyl phosphate, 1% basic lead silicate and 60% of polymerized vinyl chloride was worked on a two-roll differential speed roll mill with the hot roll at 160° C. for 5 minutes. A portion of the composition was removed from the rolls and molded for 30 minutes at 325° F. at a pressure of 2,000 pounds per square inch. The molded sheet had a low-temperature flexibility point of −33° C., a volatility loss of 1% and was non-inflammable.

I claim:

1. A composition of matter comprising a polyvinyl chloride resin selected from the group consisting of polyvinyl chloride and copolymers containing predominantly combined vinyl chloride and containing 20 to 60% of a monalkyl diaryl phosphate ester of the type

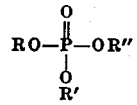

wherein R is selected from the group consisting of an alkyl radical containing at least 6 and not more than 12 carbon atoms and an alkoxyethyl group wherein the alkyl substituent has at least 4 and not more than 12 carbon atoms, R' is the phenyl radical and R'' is a cresyl radical.

2. A plasticized polymerized vinyl chloride composition characterized by good low-temperature flexibility, low volatility loss of plasticizer and non-inflammability and being comprised of a polyvinyl chloride resin selected from the group consisting of polyvinyl chloride and copolymers containing predominantly combined vinyl chloride and containing 30 to 45% of a monoalkyl diaryl phosphate ester of the type

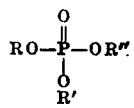

wherein R is selected from the group consisting of an alkyl radical containing at least 6 and not more than 12 carbon atoms and an alkoxyethyl group wherein the alkyl substituent has at least 4 and not more than 12 carbon atoms, R' is the phenyl radical and R'' is a cresyl radical.

3. A plasticized composition comprising polyvinyl chloride and 20 to 60% of a monoalkyl phenyl cresyl phosphate wherein the alkyl radical contains at least 6 and not more than 12 carbon atoms.

4. A plasticized composition comprising polyvinyl chloride and 30 to 45% of a monoalkyl phenyl cresyl phosphate wherein the alkyl radical contains at least 6 and not more than 12 carbon atoms.

5. A plasticized composition of matter comprising polyvinyl chloride and 20 to 60% of an alkoxyethyl phenyl cresyl phosphate wherein the alkyl substituent contains at least 4 and not more than 12 carbon atoms.

6. A plasticized composition of matter comprising polyvinyl chloride and 20 to 60% of octyl phenyl cresyl phosphate.

7. A plasticized composition of matter characterized by good low-temperature flexibility characteristics, low volatility losses and non-inflammability and comprised of polyvinyl chloride and 30 to 45% of 2-ethylhexyl phenyl cresyl phosphate.

8. A plasticized composition of matter characterized by good low-temperature flexibility characteristics, low volatility losses and non-inflammability and comprised of the copolymerization product of vinyl chloride and vinyl acetate and 30 to 45% of 2-ethylhexyl phenyl cresyl phosphate.

9. A plasticized composition of matter comprising the copolymerization product of vinyl chloride and vinyl acetate plasticized with 20 to 60% of a monoalkyl phenyl cresyl phosphate wherein the alkyl substituent contains at least 6 and not more than 12 carbon atoms.

10. A sheet of a plasticized polymerized vinyl chloride composition characterized by good low-temperature flexibility characteristics, low volatility loss of plasticizer and non-inflammability and being comprised of a polyvinyl chloride resin selected from the group consisting of polyvinyl chloride and copolymers containing predominantly combined vinyl chloride and containing 30 to 45% of a monoalkyl diaryl phosphate ester of the type

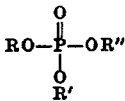

wherein R is selected from the group consisting of an alkyl radical containing at least 6 and not more than 12 carbon atoms and an alkoxy ethyl group wherein the alkyl substituent has at least 4 and not more than 12 carbon atoms, and R' is the phenyl radical and R" is a cresyl radical.

11. A sheet of a plasticized polymerized vinyl chloride comprising polymerized vinyl chloride and 20-60% of a mixture of 2-ethylhexyl phenyl cresyl phosphates, wherein the said mixture of 2-ethylhexyl phenyl cresyl phosphates is characterized by the fact that the cresyl substituents are derived from a commercial cresol containing a mixture of isomeric cresols.

12. A plasticized composition comprising polymerized vinyl chloride and 20-60% of a mixture of 2-ethylhexyl phenyl cresyl phosphates, wherein the said mixture of 2-ethylhexyl phenyl cresyl phosphates is characterized by the fact that the cresyl substituents are derived from a commercial cresol containing a mixture of isomeric cresols.

HARRY R. GAMRATH.

REFERENCES CITED

The following references are of record in the file of this patent:

UNITED STATES PATENTS

| Number | Name | Date |
|---|---|---|
| 1,462,306 | St. John | July 17, 1923 |
| 2,117,283 | Bass | May 17, 1938 |
| 2,191,056 | Wick | Feb. 20, 1940 |
| 2,227,154 | Russell | Dec. 31, 1940 |
| 2,278,231 | Wright | Mar. 31, 1942 |